United States Patent
Ciemny et al.

(10) Patent No.: US 7,227,083 B2
(45) Date of Patent: Jun. 5, 2007

(54) THERMOSTAT AND PANEL COVER

(76) Inventors: William G. Ciemny, 523 Chews Landing Rd., Haddonfield, NJ (US) 08033; Theresa Ciemny, 523 Chews Landing Rd., Haddonfield, NJ (US) 08033

( * ) Notice: Subject to any disclaimer, the term of this patent is extended or adjusted under 35 U.S.C. 154(b) by 0 days.

(21) Appl. No.: 11/172,405

(22) Filed: Jun. 30, 2005

(65) Prior Publication Data

US 2007/0000679 A1 Jan. 4, 2007

(51) Int. Cl.
*H02G 3/14* (2006.01)

(52) U.S. Cl. .......................... 174/66; 174/67; 220/241; 439/147

(58) Field of Classification Search ............ 174/66–67; 439/147, 135; 220/241–242
See application file for complete search history.

(56) References Cited

U.S. PATENT DOCUMENTS

| | | | |
|---|---|---|---|
| 3,299,199 A * | 1/1967 | Mattingly | 174/50 |
| 3,752,900 A | 8/1973 | Harrison et al. | |
| 3,975,703 A | 8/1976 | Andresen, Jr. | |
| 4,090,165 A | 5/1978 | Rae | |
| D249,476 S | 9/1978 | Kolbow | |
| 4,233,779 A | 11/1980 | Griffith | |
| D261,367 S | 10/1981 | Janson | |
| 4,303,827 A | 12/1981 | Kyles | |
| 4,347,443 A | 8/1982 | Whitney | |
| 4,460,125 A | 7/1984 | Barker et al. | |
| 4,533,894 A | 8/1985 | Bishop et al. | |
| 4,543,445 A | 9/1985 | Turner | |
| 4,546,237 A | 10/1985 | Collins | |
| 4,588,851 A | 5/1986 | Turner | |
| 4,605,841 A | 8/1986 | Fischer et al. | |
| 4,641,012 A | 2/1987 | Roberts | |
| 4,669,654 A | 6/1987 | Levine et al. | |
| 4,872,575 A * | 10/1989 | Kobilan | 220/3.3 |
| 5,060,486 A | 10/1991 | Linstromberg | |
| 5,101,471 A | 3/1992 | Bill | |
| 5,170,752 A | 12/1992 | Binversie et al. | |
| D337,058 S | 7/1993 | Papanikolaou | |
| 5,224,649 A | 7/1993 | Brown et al. | |
| 5,279,264 A | 1/1994 | Simmons et al. | |
| 5,292,064 A | 3/1994 | Saur et al. | |
| 5,293,844 A | 3/1994 | Threatt | |
| 5,381,950 A | 1/1995 | Aldridge | |

(Continued)

OTHER PUBLICATIONS

Color photographs of existing covers with rounded top and hole on back piece.

(Continued)

*Primary Examiner*—Dhiru R. Patel
(74) *Attorney, Agent, or Firm*—Donald R. Piper, Jr.; Dann, Dorfman, Herrell & Skillman, PC

(57) ABSTRACT

A housing is provided for covering an object on a building wall. The housing includes sidewalls and a front cover supported relative to the sidewalls. The sidewalls and front cover function to form an interior space generally within the sidewalls and front cover to house the object on the building wall within the interior space. The front cover is movable between an open position exposing the interior space and a closed position enclosing the interior space. A back section is generally open to permit positioning around objects of varying sizes and shapes on the building wall so as to enable such objects to be housed within the interior space.

19 Claims, 3 Drawing Sheets

U.S. PATENT DOCUMENTS

| | | | |
|---|---|---|---|
| 5,389,740 A * | 2/1995 | Austin | 174/67 |
| D359,244 S | 6/1995 | Perkins et al. | |
| 5,644,302 A | 7/1997 | Hana et al. | |
| 5,813,361 A | 9/1998 | Milliman | |
| D418,762 S | 1/2000 | Dushane et al. | |
| 6,121,578 A | 9/2000 | Owens et al. | |
| 6,145,752 A | 11/2000 | Jackson | |
| 6,207,899 B1 * | 3/2001 | Gillespie | 174/66 |
| 6,300,599 B1 | 10/2001 | Owens et al. | |
| 6,315,261 B1 | 11/2001 | Snyder | |

OTHER PUBLICATIONS

Color photographs of existing covers with rounded top and no hole showing on back piece.

Color photograph of existing cover with metal front.

* cited by examiner

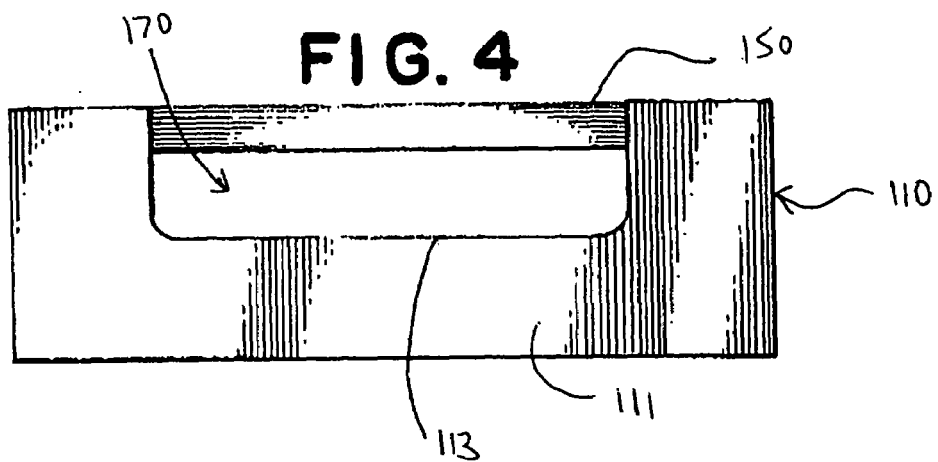
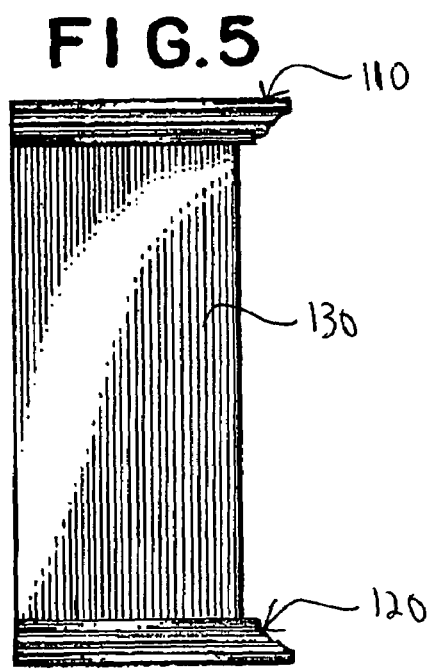 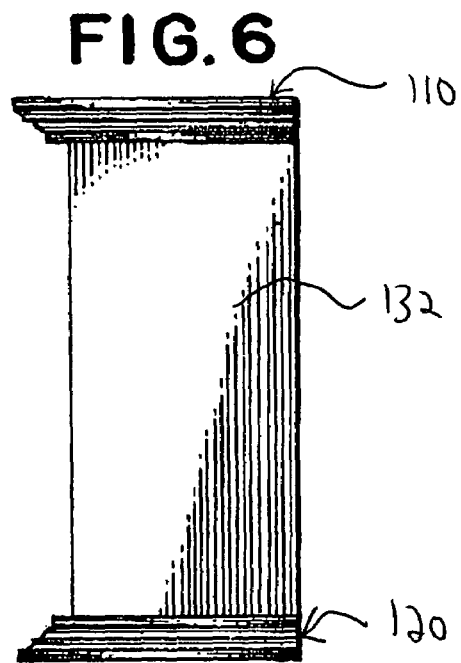
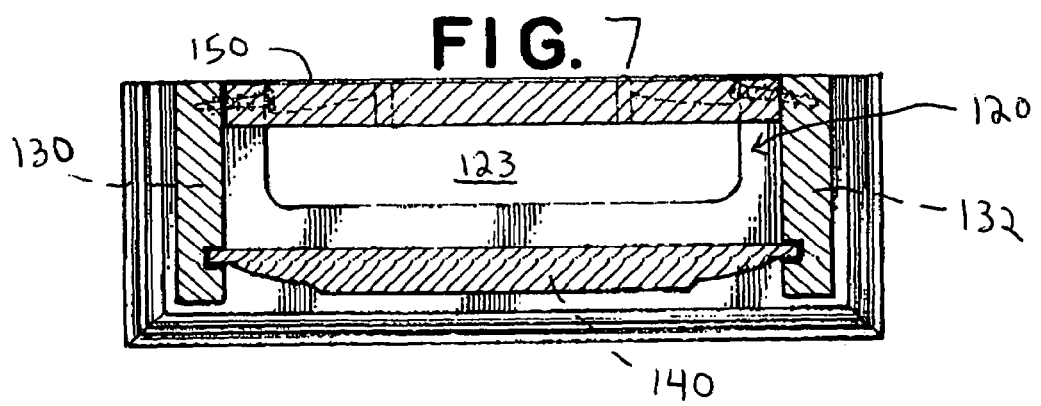

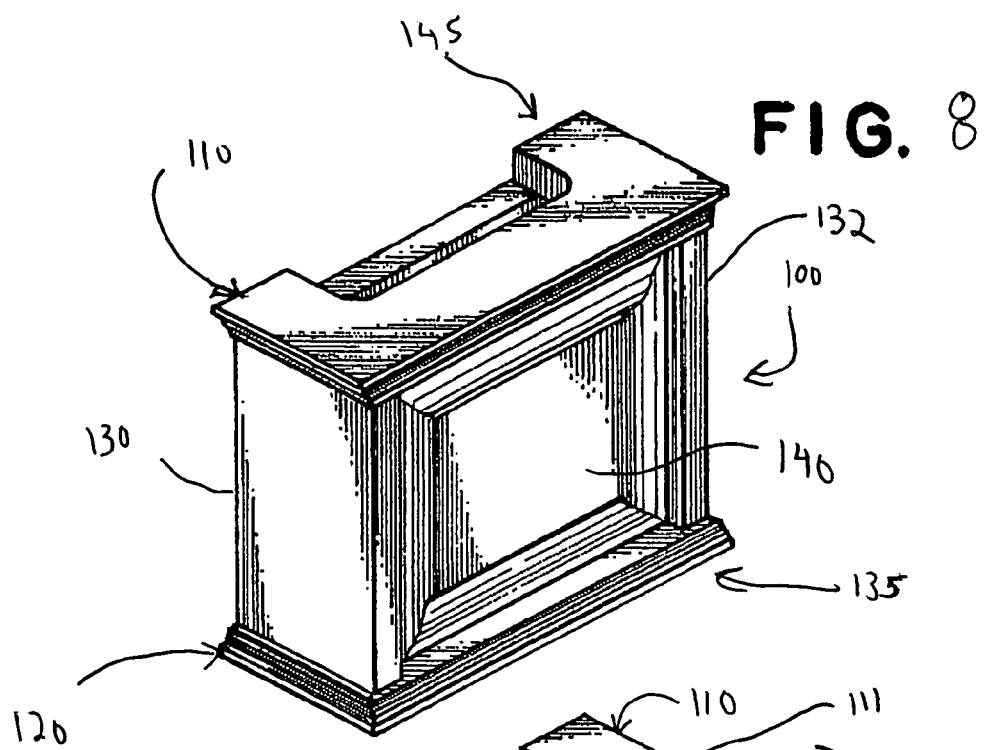
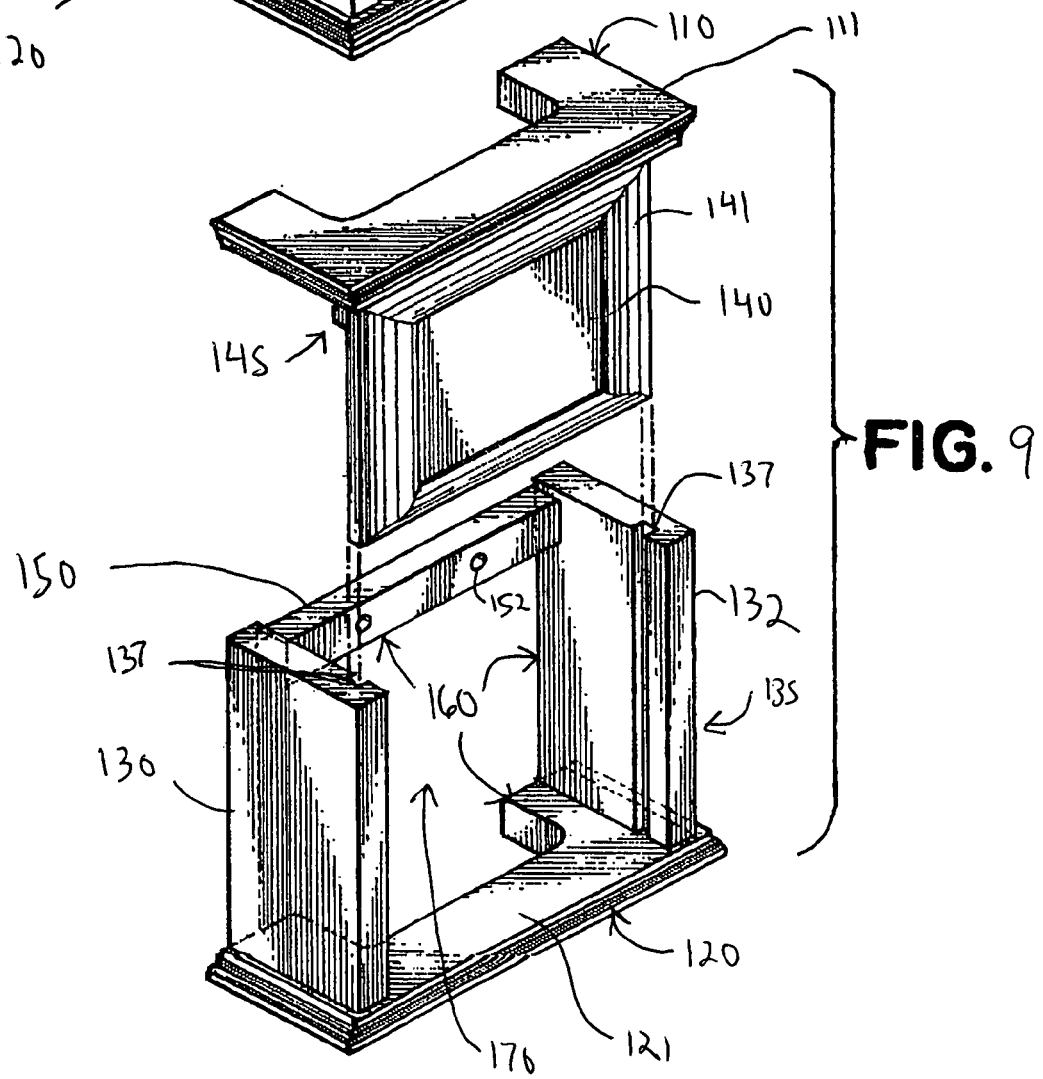

THERMOSTAT AND PANEL COVER

FIELD OF THE INVENTION

The present invention relates to a housing unit device for covering another object on a wall and, more specifically, to a cover useful for shielding other objects such as thermostats and panels from view on a wall.

BACKGROUND OF THE INVENTION

Many types of buildings, such as offices, homes, stations, garages, and sheds, require panels for regulating some variable property of the structure. Variable properties include attributes such as the temperature of the rooms inside an office or home, the status of an alarm system, the amount of electricity used by a building or home, the amount of lighting or the status of a fountain in a park, or the status of a sign in a station.

The variable properties of manmade structures are often monitored and regulated by a control panel mounted on a wall. Control panels may include, for example, light switches, security panels, keyboards, thermostats, or electrical meters, as well as other types of related panels or displays. The designated operator or user of a control panel may have an interest in preventing others from manipulating or viewing the status of these control panels. Sometimes there simply exists a fundamental desire to provide an esthetically pleasing cover over an unsightly panel such as a thermostat on a home wall.

SUMMARY OF THE INVENTION

In accordance with the present invention, a housing unit is provided for shielding control panels. The current invention provides a cover device designed to fit over all types of control panels and particularly over control panels mounted on walls. In a specific application, the cover device may be used to cover a thermostat on a building wall such as a room wall in a house. By providing a large open space in the back of the cover, a versatile cover is provided to fit over many different types and sizes of control panels. To further accommodate the need to cover large or small control panels, the current invention may be constructed in varying sizes or shapes.

In accordance with the present invention, a housing unit is provided for covering an object, such as a control panel, on a building wall. The housing may include a pair of sidewalls suitable for mounting onto the building wall in position to house the object on the building wall between such sidewalls. The sidewalls may typically have sufficient depth relative to the wall to enclose control panels of varying relief. In a particular embodiment, the sidewalls may be oriented in a generally upright manner extending parallel with one another. The sidewalls can have a sufficient height to enable the housing to be used with control panels having various heights relative to the length of the sidewalls. A front cover may be supported relative to the sidewalls to form an interior space generally contained within the sidewalls and the front cover in order to house the object on the building wall within such interior space. To facilitate use of the housing, the front cover may be movable between an open position exposing the interior space and a closed position enclosing the interior space. When in the open position, the control panel will be exposed to a user. When in the closed position, the control panel will be sheltered or shielded from view. A generally open back section is provided on the housing unit that is suitable to engage the building wall. The back section may have a back surface that conforms in shape to the surface on which the housing is to be mounted, such as flat for flat mounting surfaces and curved for curved mounting surfaces, so that the back surface of the housing sits or rests flush against the mounting surface. The back section is preferably generally open to enable objects of varying size or surface area or configuration to be contained between the sidewalls within the interior space of the housing. In a particular embodiment, the back section may be mostly open to enable objects of varying and different sizes and shapes to be housed within the interior space between the sidewalls. For this purpose, the back section may in some applications, be open almost completely, if not entirely, between the sidewalls and if desired, between the top and bottom of the housing. Optionally, a locking mechanism maybe provided to lock the cover in the closed position. The locking mechanism may be unlocked in order to permit the cover to be moved to the open position.

In a particular application of the present invention, the housing unit may also include a top section having an optional lid panel and a bottom section having an optional base member. The sidewalls may be supported relative to the base member in generally upright positions at opposite ends of the base member. The front cover may optionally be supported relative to the sidewalls to form an interior space generally contained between the sidewalls, between the lid panel and the base member, and within the front cover to enable an object on the building wall to be housed within the interior space. The front cover may be movable between an open position exposing the interior space and a closed position enclosing the interior space. For such purposes, guide tracks may be provided on an interior surface of the sidewalls to enable the front cover to move along such guide tracks relative to the sidewalls. The guide tracks may take the form of grooves on inner surfaces of the opposing sidewalls to enable the front cover to slide and move along such grooves between the open position and the closed position. Optionally, the front cover may be entirely removed from the sidewalls while in the open position. In a particular embodiment, the lid panel may be attached to or be integral with the front cover to form a cover unit that may be movable as a unit relative to the base member and the sidewalls. The base member and the sidewalls may also be joined together or integral with each other to form a stationary base unit mountable onto the wall. A back section of the housing suitable to engage the building wall may be generally open to permit the object on the building wall to be housed within the interior space between the sidewalls and between the lid panel and base member. In a specific embodiment, the back section may be mostly open and may optionally be open generally between the sidewalls and generally between the top and bottom sections of the housing unit to permit the housing unit to be used within many different types and sizes of control panels. The bottom section may also include a generally open bottom, such as an enlarged opening in the base member, to expose the object on the building wall within the interior space from below to ambient conditions. In a particular embodiment, the bottom section may be mostly open or even completely open. Likewise, the top section may include a generally open top, such as an enlarged opening in the lid panel, to expose the object within the interior space from above to ambient conditions. Likewise, in a particular embodiment, the top section may be mostly open or even completely open. A wall mount may be positioned, for example, at the back section of the housing, to enable attachment of the housing to the building wall. The wall mount may take the form of a mounting bar or bracket extending between the sidewalls along the back section of the housing unit. A locking mechanism may also be provided to permit the front cover to be locked in a closed position and to be unlocked to permit the front cover to be moved to the open position.

The housing in accordance with the current invention may include an elegant sliding mechanism for the front cover to allow access to the control panel when the front cover is in an open position and to enable protection of the control panel when the front cover is in the closed position. The sliding mechanism is useful to permit repetitive opening and closing of the cover without damage to its structure. Because many control panels are frequently adjusted or monitored, a durable mechanism is desirable. Additionally a particular sliding mechanism may be used to allow the user to entirely remove the cover in the open position to allow hands-free, unobstructed access to the control panel. Other types of configurations for the opening and closing of the front cover may be employed.

Multiple locking mechanisms may also be used to lock the cover in the closed position.

BRIEF DESCRIPTION OF THE FIGURES

FIG. 4 is a top plan view of the unit shown in FIG. 1.

FIGS. 5 and 6 are side elevational views of the unit shown in FIG. 1.

FIG. 7 is a sectional view taken along line 7—7 of FIG. 1.

FIG. 8 is a perspective view of the unit shown in FIG. 1 with a front section of the unit shown in a closed position.

FIG. 9 is a perspective view of the unit shown in FIG. 1 with the front section of the unit shown in an open position.

DETAILED DESCRIPTION OF PREFERRED EMBODIMENTS

Figure 2:
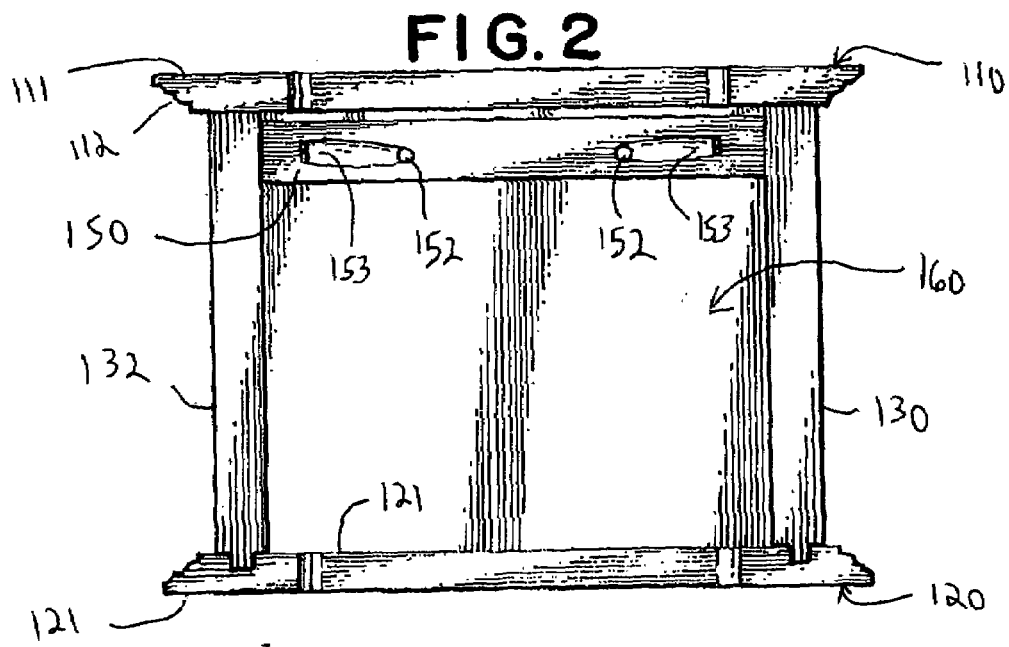
FIG. 2 is a rear elevational view of the unit shown in FIG. 1.

Referring to the drawings and, more particularly to FIGS. 8 and 9, a cover housing unit, generally designated 100, is depicted for covering an object, such as a control panel in the form, for example, of a thermostat, on a building wall. The housing 100 is configured to mount on a mounting surface such as a building wall to provide a protective and, optionally, decorative cover for the control panel or thermostat. The housing 100 may include architecturally desirable features such as decorative molding or shapes to provide an esthetically pleasing cover. The housing is preferably constructed of a suitable material for purposes of protecting the housed control panel and may be opaque for purposes of hiding the control panel or thermostat. For this purpose, the housing may be constructed of a suitable material such as wood, resin, fiberglass, plaster or cements or ceramic, or any suitable combinations of such materials or other suitable materials. As depicted in the drawings, the housing 100 generally includes a top section 110, a bottom section 120, a pair of sidewalls 130 and 132 and a front cover 140. As best shown in FIG. 9, the housing also includes an optional wall mount 150 suitable for mounting the housing to the building wall. As best shown in FIG. 2 and FIG. 9, the housing 100 is generally formed as a box-like structure having a generally hollow interior 170 and a back section 160 that is generally open with the exception of the wall mount 150 extending across the back. The housing includes a generally open back section 160 to enable the housing to be conveniently inserted over control panels or thermostats of varying or different sizes. Maximizing the back opening increases the versatility of using the housing on control panels of varying shapes and sizes. For example, the back section may be open or mostly open. However, in certain applications, small panels or border panels may be used. In the particular arrangement shown in the drawings, there is no back panel so that the rear surface of the sidewalls 130 and 132, the bottom section 120, and the mount 150 provide the surface to conform to and engage the wall or other surface on which the housing 100 will be mounted.

As best shown in FIG. 8, the housing may be closed to enclose the control panel or thermostat within the interior of the housing. For this purpose, the front cover 140 is movable to the closed position as shown in FIG. 8 in order to protect or obscure the control panel or thermostat contained within the housing. As best shown in FIG. 9, the housing also includes an open position in order to permit user access to the control panel or thermostat contained within the housing. For this purpose, the front cover 140 can be moved to the open position to thereby expose the control panel or thermostat within the housing to a user. In fact, in certain applications, it may be desirable for the front cover to be completely removable as shown, for example, in FIG. 9.

Considering the construction of the housing unit 100 in greater detail, the housing 100 unit may preferably be constructed in the form of a box-like structure suitable to mount on a wall or wall-like structure and contain an object on the wall, such as a control panel, for example, in the form of a thermostat within the generally hollow interior 170 of the housing. The shape of the housing may take other forms or configurations suitable for the particular application or the esthetics desired for the housing. As shown in the drawings, the housing 100 is designed for a particular application in which the housing is to be mounted on a generally flat wall-like structure, such as the wall of the building. For this purpose, the back section 160 of the housing includes a generally flat back surface to conform to the shape of the wall so as to fit flushly against the wall. The back surface could be modified, however, to accommodate mounting surfaces having other shapes. For example, if the housing is to be mounted onto a cylindrical column, the back surface could optionally take on a concave cylindrical shape to mesh against the outer convex surface of the column. The overall box-like structure of the housing could also be modified to take on a more cylindrical appearance overall. Other shapes might also be useful.

Figure 1:
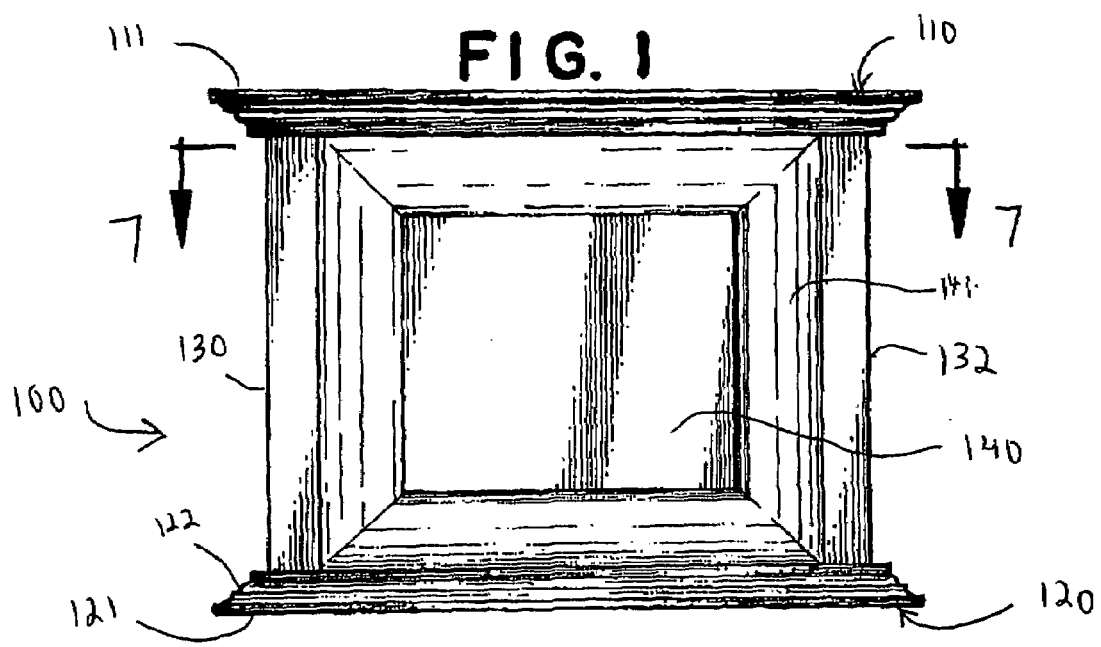
FIG. 1 is a front elevational view of the housing unit of the present invention.
Figure 3:
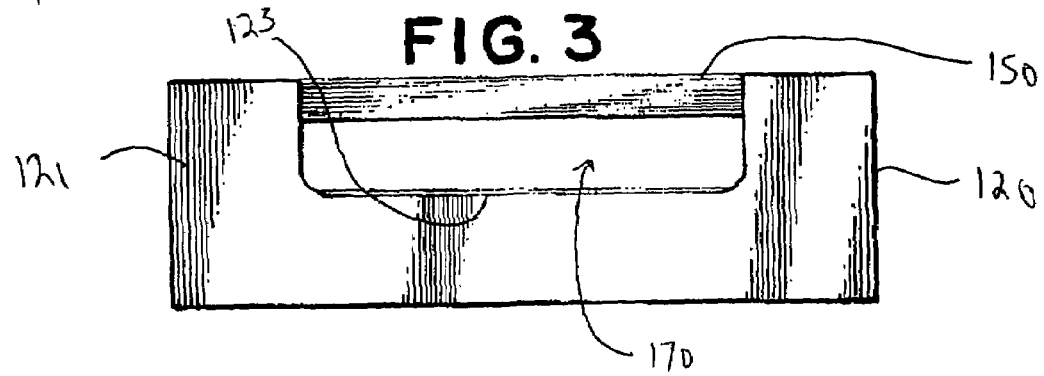
FIG. 3 is a bottom plan view of the unit shown in FIG. 1.

The bottom section 120 of the housing may be provided in the form of a generally flat elongated base member 121. As shown in FIG. 1, the base member 121 may include an outer decorative surface or molding 122 for architectural or esthetic reasons. As best shown in FIG. 3, the base member 121 may be generally U-shaped to provide an enlarged opening 123 at the bottom section of the housing to expose the generally hollow interior 170 of the housing to the ambient environment. The enlarged opening 123 extends longitudinally most of the length of the base member 121 and extends transversely at least half way into the base member 121. A different size opening may be used in particular applications. The enlarged opening 123 is offset to one side of the base member to facilitate construction. The enlarged opening 123 is also offset toward the rear surface of the housing, as shown in FIG. 3, so as to be bordered by the wall on which the housing is to be mounted to minimize surface contract with the wall surface on which the housing 100 will be mounted. Positioning of the opening 123 toward the rear surface of the base member 121 also functions to better obscure the control panel from both view and touch. The opening 123 functions, for example, to expose the enclosed control panel such as a thermostat to ambient temperatures to provide for proper regulation of room temperature.

As best shown in FIG. 2, sidewalls 130 and 132 are supported relative to the base in generally upright positions. In the particular application shown in FIG. 2, the sidewalls may be attached to the base 121 in a generally parallel arrangement opposing one another at or toward the opposite ends of the base member 121. As shown in FIG. 2, the sidewalls 130 and 132 may be secured or mounted to the base 121, for example, in tongue and groove fashion. As shown in FIG. 2, the sidewalls 130 and 132 each have a small tongue at the bottom of each sidewall that fits snugly within a receptive groove that extends transversely in the upper surface of the base member 121. In the configuration shown in FIG. 2, the sidewalls 130 and 132 project upwardly from the base at generally perpendicular angles to the base. Other orientations may be utilized in other applications. As shown in FIGS. 2 and 3, the back surfaces of the sidewalls 130 and 132 and the base member 121, and the optional wall mount 150, are coplanar and generally flat so as to generally uniformly mate and abut against a generally flat building wall.

The top section 110 of the housing includes a top or lid panel 111 which is shaped to conveniently rest upon the top surfaces of the sidewalls 130 and 132 to form a lid for the housing enclosure. The lid 111 may include a decorative shape or molding 112 for architectural or esthetic purposes. As shown in FIGS. 1 and 2, the top panel 111 is generally uniform in shape to the base member 121 but is inverted on the housing relative to the base member to form an esthetically pleasing look. As best shown in FIG. 4, the top panel is generally flat and includes an enlarged opening 113 to provide access to the generally hollow interior 170 of the housing so as to expose such interior 170 from above to the ambient environment. As best shown in FIG. 4, the top panel may be generally U-shaped to provide the enlarged opening 113 at the top of the housing similar in arrangement and location as opening 123 on the base member 121 and for similar functions and purposes as opening 123.

As best shown in FIG. 9, the front cover 140 may include a generally rectangular or square shaped face member. The front cover 140 may be secured to a bottom surface of the top panel 111 toward the front edge of the top panel 111. As shown in FIG. 9, the front cover 140 may be attached to the bottom surface of the top panel 111 in a generally perpendicular arrangement with respect to the top panel 111 to form a right angle. The front cover 140 may be secured to the top panel 111 in other configurations and arrangements. In yet other arrangements, the front cover 140 need not be supported by or attached to the top panel at all. For example, the top panel 111 may be attached to or be integral with one or both of the sidewalls. The front cover 140 may include decorative moldings or features 141 for architectural or esthetic purposes. As shown in FIG. 9, when the front cover 140 is secured to the top panel 111, a cover unit, generally designated 145, is provided that may be removed from a base unit, generally designated 135, provided by the base member 120 and the sidewalls 130 and 132. The cover unit 145 may be removed from the base unit 135, as shown in FIG. 9, to open the housing and thereby expose the contained control panel to a user. As shown in FIG. 8, the cover unit 145 may also be moved to a closed position relative to the base unit 135 to thereby enclose the control panel within the housing and thereby conceal the control panel from view. The cover unit 145 may also be moved to an open position relative to the base unit 145 without being completely removed from the base unit 135.

In order to permit the front cover 140 to be moved between open and closed positions, the housing includes guide tracks 137 disposed, for example, on the inner surfaces of the opposing sidewalls 130 and 132 of the housing. For this purpose, the guide tracks may take the form of generally parallel opposing slots or grooves that extend from the top surface of the sidewalls 130 and 132 to the bottom of the sidewalls. The grooves 137 may terminate at stops which prevent any further downward movement of the front cover 140 within the slots 137. As shown in FIG. 9, the stops may be provided as the top surface of the base member 121 so that when the front cover is closed, the bottom of the front cover 140 will engage and rest upon the top surface of the base member 121 preventing further downward movement of the cover. When front cover 140 is secured to the top panel 111 in the manner shown in FIG. 9, the housing may be configured so that the under side of the top panel 111 comes to rest near or against the top surface of sidewalls 130 and 132 when the unit is in the closed position. Furthermore, the housing unit may be arranged so that it is the engagement of the top panel 111 with the tops of the sidewalls 130 and 132 that acts as the stop to prevent further downward movement of the front cover 140 within the guide grooves 137.

To permit the housing unit 100 to be conveniently mounted onto a wall, the mount 150 is provided in the form of a bar that extends across the generally open back section 160 of the housing. Preferably, the rear surface of the bar conforms to the surface on which the housing is to be mounted. Alternatively, the bar may be recessed into the hollow interior 170 so as to not project beyond the back surface of the housing. As shown in FIGS. 3 and 4, the rear surface of the bar 150 is generally flat to conveniently abut against the wall of the building, for example, upon which the housing will be mounted. To facilitate the mounting of the housing, the mount 150 includes apertures 152 which may serve as screw or nail holes, for example. As shown in FIG. 2, channels 153 may be provided on the back surface of the mount 150 to enable the mount to be attached to the sidewalls by screws. In use, the base unit 135 will be placed in a desired position on a building wall so that the control panel, such as a thermostat, is positioned somewhere within the interior of the housing between the sidewalls 130 and 132 and between the bottom of the mount 150 and the top of the base member 121. As shown in FIG. 9, the back section 160 of the housing is generally open and may, for example, be open completely between the inner surfaces of the sidewalls 130 and 132 and almost completely open between the upper surface of the base member 121 and the bottom surface of the mount 150, or in other applications the bottom surface of the lid panel 111, to provide maximum versatility of the housing for use over control panels of different and varying sizes and shapes. For increased versatility of the housing for use with control panels of varying sizes and shapes, the open back section may be approximately 90% open, or even more if desired, relative to the inside perimeter of the sidewalls, the top of the base member and at the bottom of the top panel. In other words, in a particular embodiment, the back section may have an opening that is at least half as large as the total area of the building wall that will be located between the sidewalls. By providing a sufficiently large open back section, the housing may be shifted upward, downward, or to the left or right relative to the control panel so that the control panel is not necessarily centered within the housing.

It will be recognized by those skilled in the art that changes or modifications may be made to the above-described embodiments without departing from the broad inventive concepts of the invention. For example, the top panel may be secured in place relative to the sidewalls so that the front cover may be opened and closed relative to the sidewalls, the base member, and the top panel as well. As another example, the housing may include a lock mechanism such as a keylock built into the housing, a lock loop and bar for use with a separate padlock, or some other type of locking mechanism, for example, a combination lock. Also, the housing could be rotated, for example, so that the sidewalls become the top and bottom while the top and bottom become the sidewalls. It should therefore be understood that this invention is not limited to particular embodiments described therein, but is intended to include all changes and modifications that are within the scope and spirit of the invention as set forth in the following claims.

What is claimed is:

1. A housing for covering an object on a building wall within an interior space of the housing comprising:
   a. a top section wherein said top section includes a top panel having an opening to provide a generally open top portion to expose the object on the building wall within the interior space from above to ambient conditions;
   b. a bottom section;
   c. sidewalls supported relative to the bottom section at opposite ends of the bottom section and extending to the top section;
   d. a front cover supported relative to the sidewalls to form an interior space generally contained within the sidewalls and the front cover to house an object on the building wall within the interior space, the front cover movable between an open position exposing the interior space and a closed position enclosing the interior space; and
   e. a back section suitable to engage the building wall, the back section being mostly open to enable objects of varying size on the building wall to be housed between the sidewalls within the interior space.

2. The housing of claim 1 wherein the back section is generally open between the sidewalls.

3. The housing of claim 2 wherein the back section is generally open between the top and bottom sections.

4. The housing of claim 1 wherein the back section is generally open between the top and bottom sections.

5. The housing of claim 1 wherein the bottom section includes a generally open bottom to expose the object on the building wall contained within the interior space from below to ambient conditions.

6. The housing of claim 5 wherein the bottom section includes a base member having an enlarged opening that is disposed to be bordered by the building wall.

7. The housing of claim 1 wherein the opening of the top panel includes an enlarged opening disposed to be bordered by the building wall.

8. The housing of claim 1 wherein the sidewalls include guide tracks for receiving the front cover and wherein the front cover slides between the open and closed positions along the guide tracks.

9. The housing of claim 8 wherein the guide tracks include opposing grooves along the interior of the sidewalls to permit the front cover to slide up and down relative to the sidewalls.

10. The housing of claim 9 wherein the top section is joined to the front cover to enable the top section and front cover to slide between the open position and the closed position relative to the sidewalls.

11. The housing of claim 1 including a wall mount positioned at the back section to enable attachment to the building wall.

12. The housing of claim 1 wherein the back section includes a back surface of the sidewalls.

13. A housing for covering an object on a building wall comprising:
   a. a top section having a generally open top to expose the object on the building wall to ambient conditions, the top section including a top panel having an enlarged opening that is disposed to be bordered by the building wall;
   b. a bottom section having a generally open bottom to expose the object on the building wall to ambient conditions, the bottom section including a base member having an enlarged opening that is disposed to be bordered by the building wall;
   c. generally upright sidewalls supported relative to the bottom section at opposite ends of the base member and extending upwardly to the top section, the sidewalls having guide tracks;
   d. a front cover supported relative to the sidewalls to form an interior space generally contained within the sidewalls and the front cover to house an object on the building wall within the interior space, the front cover movable along the guide tracks between an open position exposing the interior space and a closed position enclosing the interior space;
   e. a back section suitable to engage the building wall, the back section being mostly open to enable objects of varying size on the building wall to be housed between the sidewalls within the interior space, the back section being generally open between the sidewalls and generally open between the top and bottom sections; and
   f. a wall mount positioned at the back section to enable attachment to the building wall.

14. The housing of claim 13 wherein the guide tracks include opposing grooves along the interior of the sidewalls to permit the front cover to slide up and down relative to the sidewalls.

15. The housing of claim 14 wherein the top section is joined to the front cover to enable the top section and front cover to slide between the open position and the closed position relative to the sidewalls.

16. A housing for covering an object on a building wall within an interior space of the housing comprising:
   a. a top section including a top panel having an opening to expose the object on the wall contained within the interior space to ambient air conditions;
   b. a bottom section wherein said bottom section includes a generally open bottom portion positioned relative to the building wall above the ground to expose the object on the building wall contained within the interior space from below to ambient air conditions;
   c. sidewalls supported relative to the bottom section at opposite ends of the bottom section and extending to the top section;
   d. a front cover supported relative to the sidewalls to form an interior space generally contained within the sidewalls and the front cover to house an object on the building wall within the interior space, the front cover movable between an open position exposing the interior space and a closed position enclosing the interior space; and e. a back section suitable to engage the building wall, the back section being mostly open to enable objects of varying size on the building wall to be housed between the sidewalls within the interior space.

17. The housing of claim 16 wherein the bottom section includes a base member having an enlarged opening that is disposed to be bordered by the building wall.

18. The housing of claim 16 wherein the back section is generally open between the sidewalls.

19. The housing of claim 16 wherein the back section is generally open between the top and bottom sections.

* * * * *